(12) United States Patent
Martinez et al.

(10) Patent No.: US 8,695,997 B1
(45) Date of Patent: Apr. 15, 2014

(54) DOLLY FOR TRANSPORTING SHEET MATERIALS

(76) Inventors: Carlos L. Martinez, Orlando, FL (US); Charles R. Figueroa, Riverview, FL (US)

(*) Notice: Subject to any disclaimer, the term of this patent is extended or adjusted under 35 U.S.C. 154(b) by 89 days.

(21) Appl. No.: 13/303,453

(22) Filed: Nov. 23, 2011

Related U.S. Application Data (60) Provisional application No. 61/416,849, filed on Nov. 24, 2010.

(51) Int. Cl.
*B62B 5/00* (2006.01)

(52) U.S. Cl.
USPC .................. 280/79.7; 280/79.2; 280/47.34

(58) Field of Classification Search
USPC ............. 280/79.11, 79.3, 79.7, 47.34, 87.01, 280/87.021, 47.35
See application file for complete search history.

(56) References Cited

U.S. PATENT DOCUMENTS

| | | | | |
|---|---|---|---|---|
| 1,418,569 A | * | 6/1922 | Herrick | 280/7.12 |
| D142,497 S | * | 10/1945 | Rider | D34/22 |
| 2,833,550 A | * | 5/1958 | Frick | 280/47.34 |
| 2,947,565 A | * | 8/1960 | Wood | 296/3 |
| 3,628,807 A | * | 12/1971 | Fullington et al. | 280/79.3 |
| 3,746,358 A | * | 7/1973 | Swick et al. | 280/651 |
| 3,827,573 A | * | 8/1974 | Guerette | 211/149 |
| 3,977,689 A | * | 8/1976 | Rosa | 280/33.996 |
| 4,032,165 A | * | 6/1977 | Russell | 280/79.3 |
| 4,044,978 A | * | 8/1977 | Williams | 248/640 |
| 4,117,937 A | * | 10/1978 | Ratti | 211/70.6 |
| 4,165,088 A | * | 8/1979 | Nelson | 280/47.35 |
| 5,190,305 A | * | 3/1993 | Putman | 280/79.3 |
| 5,653,458 A | * | 8/1997 | Chaparian | 280/30 |
| 5,772,222 A | * | 6/1998 | Sim et al. | 280/30 |
| 5,816,586 A | * | 10/1998 | Richmond | 280/47.34 |
| 6,607,199 B2 | * | 8/2003 | Gruber | 280/33.991 |
| 6,805,367 B1 | * | 10/2004 | Heller | 280/87.01 |
| 7,104,553 B2 | * | 9/2006 | Gruber | 280/33.991 |
| 7,896,367 B1 | * | 3/2011 | Suprono | 280/47.15 |
| 2003/0205875 A1 | * | 11/2003 | Ondrasik et al. | 280/47.34 |
| 2005/0140107 A1 | * | 6/2005 | Gruber | 280/79.11 |
| 2006/0103094 A1 | * | 5/2006 | Wiff et al. | 280/79.11 |
| 2006/0197298 A1 | * | 9/2006 | Shore | 280/79.7 |
| 2007/0102893 A1 | * | 5/2007 | Mayo | 280/79.11 |
| 2010/0310346 A1 | * | 12/2010 | Polidoros | 414/523 |

* cited by examiner

*Primary Examiner* — Jeffrey J Restifo
*Assistant Examiner* — Erez Gurari
(74) *Attorney, Agent, or Firm* — Ronald E. Smith; Smith & Hopen, P.A.

(57) ABSTRACT

A dolly includes a horizontal base plate supported by wheels and first and second upstanding support walls supported by the base plate. In a first embodiment, a horizontal step is formed in each support wall above the plane of the base plate and an item of sheet material is supported on its edge by the step. This enables a single individual to rotate the sheet material onto a countertop without lifting the sheet material from the dolly. In a second embodiment, an adjustable support bracket is movably mounted to each support wall to replace the steps so that the sheet material can be supported on edge at various heights. A third embodiment adds a foldable table with legs so that the sheet material can be rotated onto the table and slid from the table onto a surface to be covered.

3 Claims, 7 Drawing Sheets

DOLLY FOR TRANSPORTING SHEET MATERIALS

CROSS-REFERENCE TO RELATED APPLICATIONS

This application is a non-provisional of and claims priority to U.S. Patent Application No. 61/416,849, entitled "Dolly for Transporting Sheet Materials" filed by the same inventor on Nov. 24, 2010. That application is incorporated by reference into this disclosure.

BACKGROUND OF THE INVENTION

1. Field of the Invention

This invention relates, generally, to the art of transporting sheet materials. More particularly, it relates to a dolly that enables a single person to transport and unload sheet materials.

2. Description of the Prior Art

Conventional dollies that transport heavy items of sheet material such as marble slabs require two (2) workers. The slab is transported on edge, tilted slightly from the vertical, and the lowermost end of the slab is positioned near a floor surface so that lifting the slab from the dolly requires extensive bending and lifting. It also takes two people to position the slab onto a horizontal flat surface to be covered by the slab.

There is a need for a dolly that enables a single person to transport a marble slab or other item of sheet material and a single person to transfer the slab or other item from the dolly to a flat surface to be covered.

However, in view of the art considered as a whole at the time the present invention was made, it was not obvious to those of ordinary skill in the art how the needed dolly could be provided.

SUMMARY OF THE INVENTION

The long-standing but heretofore unfulfilled need for an improved dolly is now met by a new, useful, and non-obvious invention.

The novel dolly includes a flat, horizontally disposed base plate supported at its corners by conventional wheels such as caster wheels. A first support wall is mounted to the flat base plate near a first end thereof in upstanding relation thereto and a second support wall is mounted to the flat base plate near a second end thereof in upstanding relation thereto in parallel, longitudinally spaced alignment with the first support wall.

A first brace supports the first support wall and a second brace supports the second support wall. The braces are mounted on the base plate in coincidence with a longitudinal axis of symmetry of the base plate.

The first support wall has a vertical back edge that extends the entire height thereof and a vertical front edge that extends to a predetermined height that is preferably less than the height of a conventional countertop. The second support wall also has a vertical back edge that extends the entire height thereof and a vertical front edge that extends to a predetermined height that is preferably less than the height of a conventional countertop.

The first support wall has a horizontal flat surface or step formed therein at the upper end of its vertical front edge. A backwardly inclined edge extends from an inward end of the step to an uppermost flat edge of the first support wall. The second support wall also has a horizontal flat surface or step formed therein at the upper end of its vertical front edge and a backwardly inclined edge that extends from an inward end of said step to an uppermost flat edge of the second support wall.

In a second embodiment, the first support wall has a vertical back edge that extends the entire height thereof and a generally vertical front edge that extends the entire height thereof and that inclines rearwardly along its entire extent towards the vertical back edge, i.e., there is no fixed position step formed in the front edge in the second embodiment.

A first adjustable bracket is movably mounted to the inclined front edge of the first support wall and a second adjustable bracket is movably mounted to the inclined front edge of the second support wall.

The first adjustable bracket includes a pair of transversely spaced apart sidewalls that are disposed in sandwiching relation to the first support wall and the second adjustable bracket includes a pair of transversely spaced apart sidewalls that are disposed in sandwiching relation to the second support wall.

An aperture is formed in each of the sidewalls of the first and second adjustable brackets.

A first plurality of apertures is formed in the first support wall in parallel relation to the inclined front edge of the first support wall and a second plurality of apertures is formed in the second support wall in parallel relation to the inclined front edge of the second support wall.

A first pin extends through the apertures formed in the sidewalls of the first adjustable bracket and a preselected aperture of the plurality of apertures formed in the first support wall to hold the first adjustable bracket at a predetermined height along the extent of the inclined front edge of the first support wall.

A second pin extends through the apertures formed in the sidewalls of the second adjustable bracket and a preselected aperture of the plurality of apertures formed in the second support wall to hold the second adjustable bracket at a predetermined height along the extent of the inclined front edge of the second support wall.

A first flange is disposed normal to the first sidewall of the first adjustable bracket and a second flange is disposed normal to the second sidewall of the first adjustable bracket. A first flange is also disposed normal to the first sidewall of the second adjustable bracket and a second flange is disposed normal to the second sidewall of the second adjustable bracket. The first and second flanges of the first adjustable bracket are flush with the inclined front edge of the first support wall and the first and second flanges of the second adjustable bracket are flush with the front edge of the second support wall.

A first support member is secured to the first adjustable bracket and extends from the first adjustable bracket in a substantially horizontal plane when the dolly is supported on a level support surface. A second support member is secured to the second adjustable bracket and extends from the second adjustable bracket in a substantially horizontal plane when the dolly is supported on said level support surface.

The first and second adjustable brackets are positioned at any preselected height along the extent of the inclined front edge of the first and second support walls so that an item of sheet material is supported on edge by said first and second support members at said preselected height, thereby facilitating removal of the sheet material from the dolly so that a single individual can remove said sheet material from said dolly onto a horizontal support surface to be covered by said sheet material.

In a third embodiment, the first support member has a clevis formed in a distal free thereof and the second support member also has a clevis formed in a distal free thereof. The clevis of the first support member rotatably engages a first end of a table and the clevis of the second support member rotatably engages a second end of the table.

A first leg is hingedly secured to the first end of the table and a second leg is hingedly secured to a second end of the table.

The item of sheet material has a stored configuration where the table is folded so that it rests against the first and second inclined front edges of the first and second support walls and where the first and second legs are folded into abutting relation to the table. The table has a deployed configuration where the table is unfolded so that it is disposed in a substantially horizontal plane and so that the legs are disposed in a substantially vertical plane when the dolly is supported on a substantially level surface. The item of sheet material may be rotated from the stored configuration onto the table by a single individual. The item of sheet material may be slid from the table onto a surface to be covered by a single individual as well.

The primary object of this invention is to provide a dolly capable of transporting large items of sheet material, including heavy items of sheet material, which can be unloaded by a single person in the absence of bending and heavy lifting.

Another object is to provide a dolly that includes a horizontal table to facilitate adjustment of large items of sheet material when said items are in a horizontal plane.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
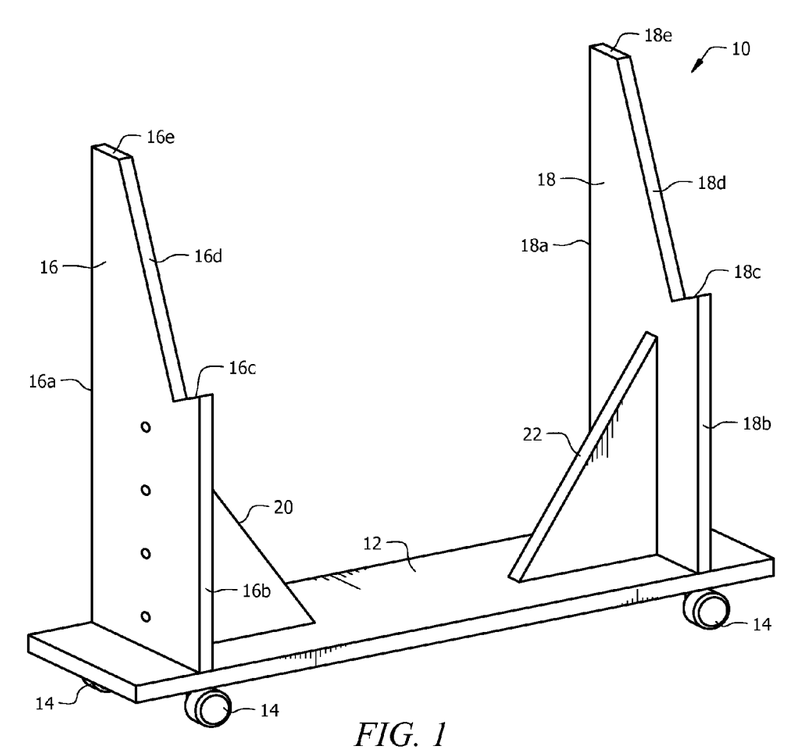
FIG. 1 is a perspective view of a first embodiment.

FIG. 1 depicts an illustrative embodiment of the novel dolly which is denoted as a whole by the reference numeral 10.

Flat base plate 12 is supported at its corners by wheels 14 in a conventional manner. First support wall 16 is mounted to said flat base plate 12 near a first end thereof in upstanding relation thereto and second support wall 18 is mounted to said flat base plate near a second end thereof in upstanding relation thereto so that it is parallel to and longitudinally spaced apart from first support wall 16. First support wall 16 is disposed in a plane that is transversely disposed relative to a longitudinal axis of flat base plate 12 and second support wall 18 is also disposed in a plane that is transversely disposed relative to said longitudinal axis.

Flat, triangular braces 20 and 22 support first and second support walls 16, 18, respectively. Said braces are preferably mounted on the longitudinal axis of symmetry of base plate 12.

Each support wall 16, 18 has a vertical back edge 16a, 18a that extends the entire height thereof and a vertical front edge 16b, 18b that extends to a predetermined height which is preferably less than the height of a typical countertop.

Each support wall 16, 18 has a horizontal flat surface or step 16c, 18c formed therein at the upper end of each vertical front edge 16b, 18b, and a backwardly inclined edge 16d, 18d that extends from an inward or rearward end of associated steps 16c, 18c to an uppermost flat edge 16e, 18e, respectively, of said support walls 16, 18.

A heavy item of sheet material such as a marble slab, not depicted in FIG. 1, or a lighter item of sheet material such as a sheet of drywall, plywood, glass, or the like, is supported on edge by steps 16c, 18c and leans against inclined edges 16d, 18d when being transported. Suitable clamps, not depicted in FIG. 1, are used to hold the item of sheet material in position, there being different commercially-available clamps used for differing items of sheet material such as marble, drywall, plywood, glass, and the like.

A second embodiment is depicted in FIGS. 2, 3, 4A and 4B. Fixed position flat surfaces or steps 16c, 18c are eliminated in this embodiment. Said steps are instead provided by adjustable-height brackets 30 and 32. Accordingly, inclined front flat edges 16d, 18d extend the entire extent of dolly 10 in this embodiment as best understood from FIG. 2.

Figure 2:
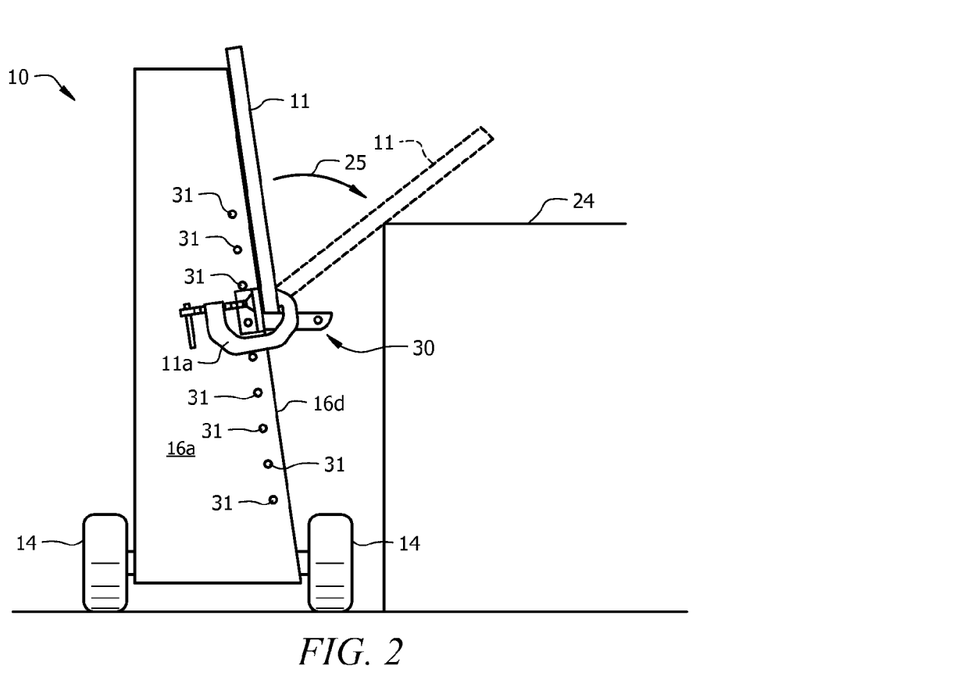
FIG. 2 is a side elevational view of a second embodiment.
Figure 3:
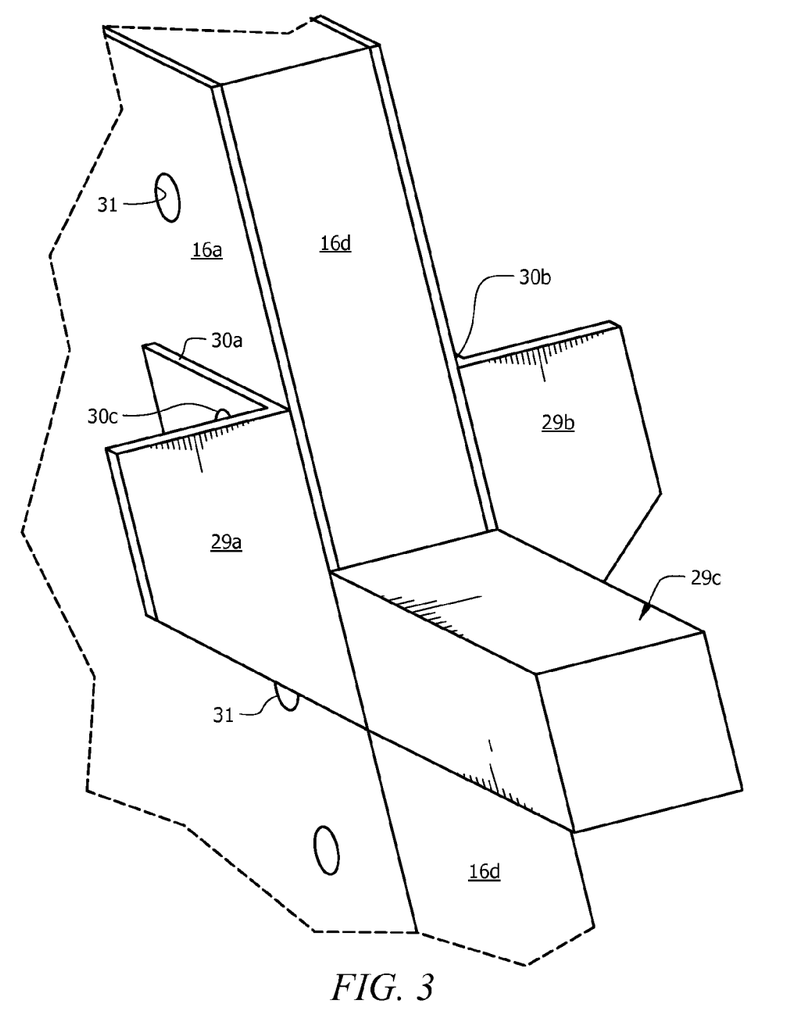
FIG. 3 is a perspective view of an adjustable bracket of the second embodiment.
Figure 4A:
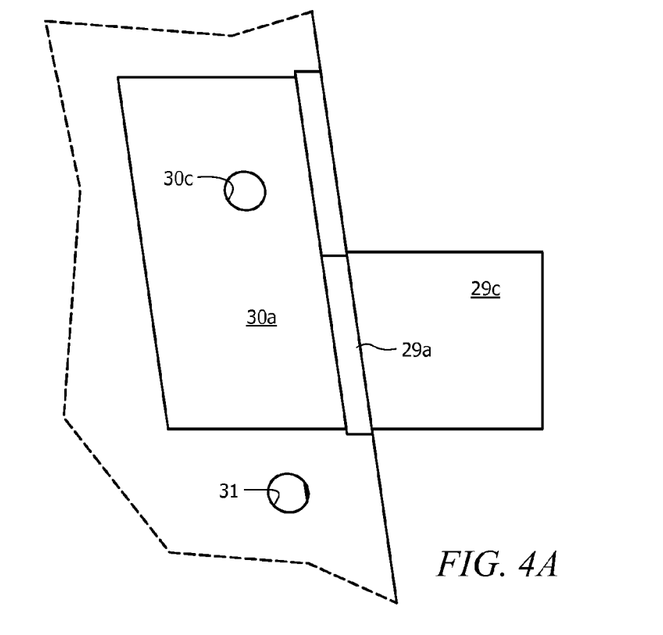
FIG. 4A is a side elevational view of the adjustable bracket of the second embodiment.
Figure 4B:
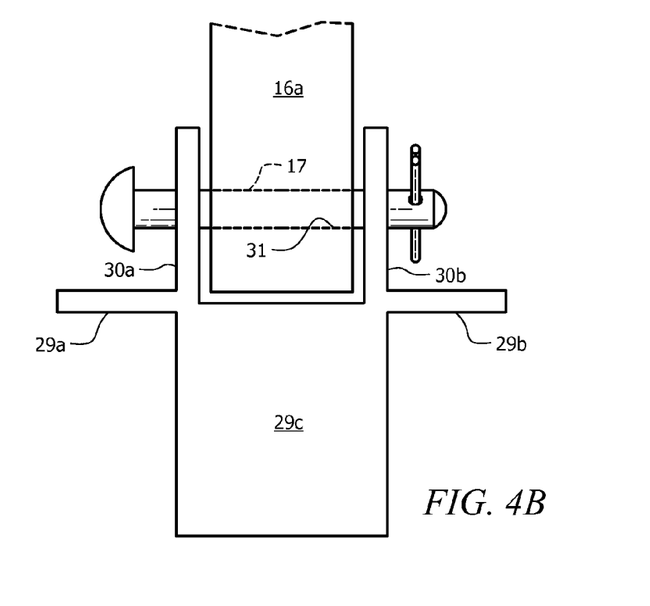
FIG. 4B is a top plan view of the adjustable bracket of the second embodiment.

Bracket 30 includes sidewalls 30a and 30b that are disposed in sandwiching relation to sidewall 16a of the dolly as best depicted in FIGS. 3 and 4B. Apertures 30c, 30d are formed in said sidewalls 30a, 30b, respectively. A large plurality of apertures, collectively denoted 31 in FIG. 2, is formed in sidewall 16a in parallel relation to inclined front edge 16d. Pin 17 extends sequentially through apertures 30c, 31 and 30d to hold bracket 30 at a predetermined location along the extent of front edge wall 16d.

Bracket 30 further includes flanges 29a and 29b that are disposed normal to sidewalls 30a, 30b and flush with front inclined edge 16d. Flanges 29a and 29b provide additional surface area for the support of an item of sheet material, denoted 11 in FIG. 2, and also provide a support surface for a "C"-clamp 11a or other type of clamp as depicted in FIG. 2.

The function of flat surface or step 16c of the first embodiment is performed in this second embodiment by support member 29c that is welded to flanges 29a, 29b and which extends therefrom in a substantially horizontal plane when dolly 10 is supported on a level support surface.

Bracket 32 is not depicted but it has the same structure as bracket 30. It includes sidewalls 32a and 32b, not depicted, that are disposed in sandwiching relation to sidewall 18a of the dolly. Apertures 32c, 32d, not depicted, are formed in said sidewalls 32a, 32b, respectively. A large plurality of apertures 31a is formed in sidewall 18a in parallel relation to inclined front edge 18d. A pin extends through apertures 32c, 31a and 32d to hold bracket 32 at a predetermined location along the extent of front edge wall 18d.

Bracket 32 further includes undepicted flanges that are disposed normal to sidewalls 32a, 32b and flush with front inclined edge 18d. Said flanges provide additional surface area for the support of an item of sheet material and also provide a support surface for "C"-clamp 11a or other type of clamp as depicted in FIG. 2.

The function of flat surface or step 18c of the first embodiment is performed in this second embodiment by an undepicted support member having the same structure as support member 29c that is welded to the flanges and which extends therefrom in a substantially horizontal plane when dolly 10 is supported on a level support surface.

The preferred method of unloading dolly 10 is also depicted in FIG. 2. Countertop 24 defines a horizontal plane that is higher than flat surfaces 16c, 18c of the first embodiment or the adjustable height flat surfaces defined by support member 29c in the second embodiment. This enables sheet of material 11 to be rotated away from inclined edges 16d, 18d while supported by flat surfaces 16c, 18c or the second embodiment counterparts thereof as indicated by arcuate directional arrow 25, until contact is made with the edge of countertop 24 as indicated in dotted lines in FIG. 2. The item of sheet material 11 is then lifted from said flat surfaces 16c, 18d or said counterparts and slid onto countertop 24.

Figure 5A:
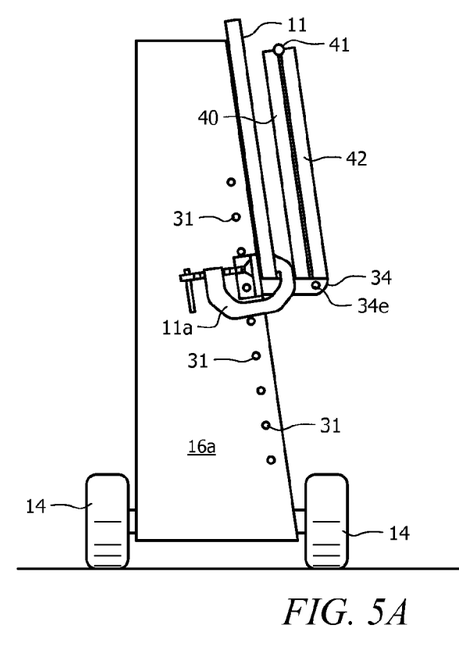
FIG. 5A is a side elevational view of a third embodiment depicting a table and legs in a folded, storage configuration.
Figure 5B:
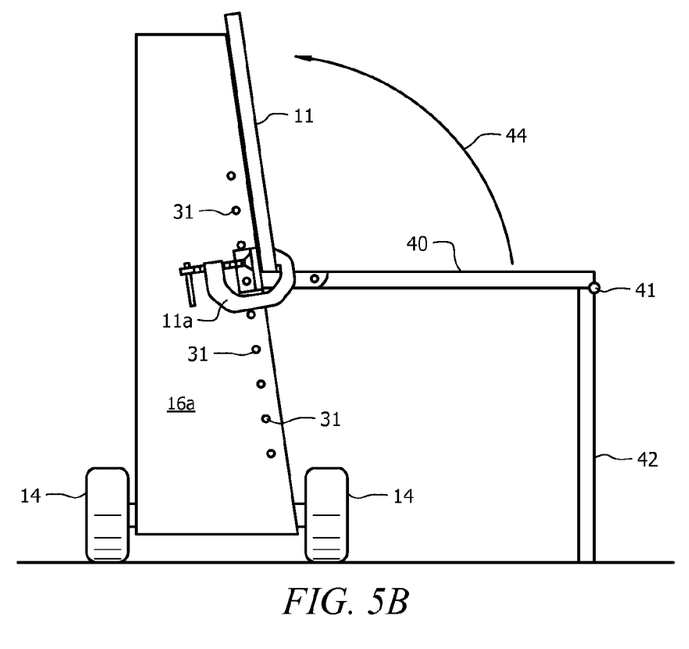
FIG. 5B is a side elevational view of the third embodiment depicting the table and legs in a deployed configuration.
Figure 6:
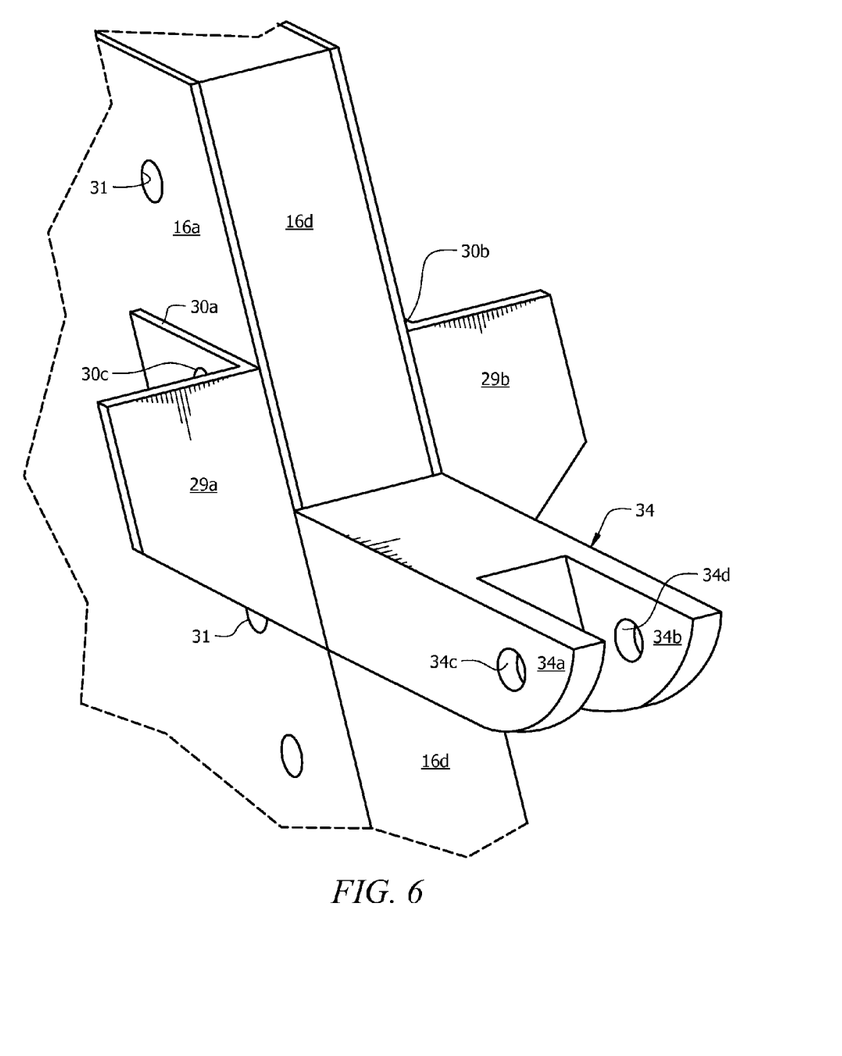
FIG. 6 is a perspective view of an adjustable bracket of the third embodiment.
Figure 7A:
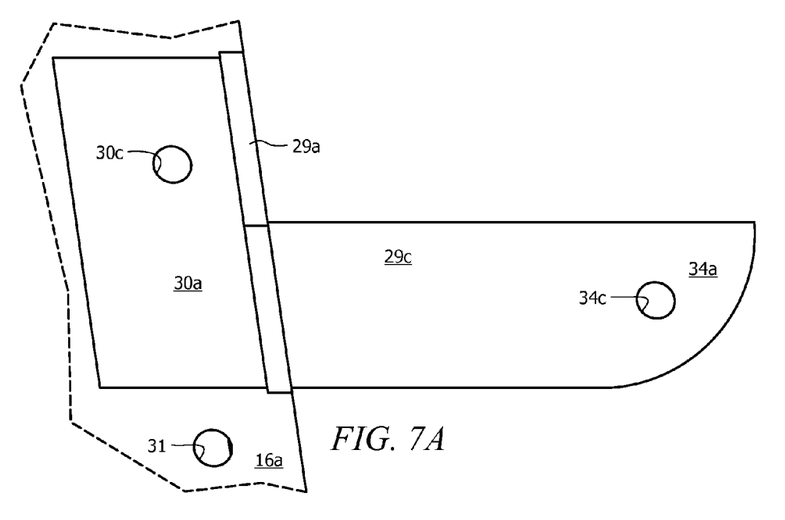
FIG. 7A is a side elevational view of the adjustable bracket of the third embodiment.
Figure 7B:
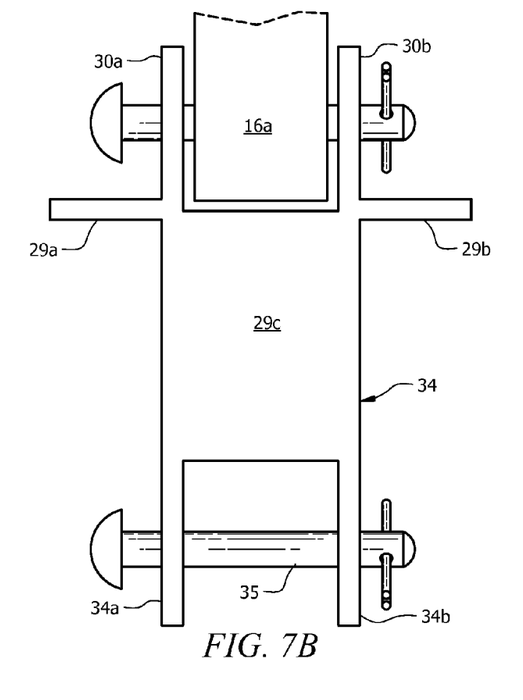
FIG. 7B is a top plan view of the adjustable bracket of the third embodiment.

In a third embodiment, depicted in FIGS. 5A, 5B, 6. 7A, and 7B, support member 29c of the second embodiment and its undepicted counterpart are extended to form a shackle or clevis. Shackle 34 includes transversely opposed arms 34a, 34b, each of which is centrally apertured as at 34c, 34d, respectively, as perhaps best understood from FIG. 6. The undepicted counterpart of shackle 34 that forms a part of the undepicted bracket that engages inclined front edge 18d has the same construction. Pin 35 extends through apertures 34c, 34d, as depicted in FIG. 7B, and a pin having the same structure extends through the apertures formed in the undepicted shackle.

Each pin engages a bore formed in a table, denoted 40 in FIGS. 5A and 5B, that is stored in a folded configuration where its unpinned end rests against flat front edges 16d, 18d as depicted in FIG. 5A. The table also includes legs 42 that are hingedly secured as at 41 to opposite ends of the unpinned end of the table. When table 40 is rotated away from its stored configuration, legs 42 are unfolded into a vertical configuration as depicted in FIG. 5B so that table 40 is supported by said legs when table 40 is deployed in a horizontal configuration. This enables a large item of sheet material to be slid from table 40 to a surface to be covered or from that surface back to the table if adjustments are needed. When table 40 is no longer needed, it is rotated from its FIG. 5B position as indicted by directional arrow 44 into its folded, storage position as depicted in FIG. 5A.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A dolly, comprising:
  a flat, horizontally disposed base plate supported at its corners by wheels;
  a first support wall mounted to said flat base plate near a first end thereof in upstanding relation thereto;
  a second support wall mounted to said flat base plate near a second end thereof in upstanding relation thereto in parallel longitudinal alignment with said first support wall;
  said first support wall having a vertical back edge that extends the entire height thereof and a front edge that extends the entire height thereof and that inclines rearwardly along its entire extent towards said vertical back edge;
  said second support wall having a vertical back edge that extends the entire height thereof and a front edge that extends the entire height thereof and that inclines rearwardly along its entire extent towards said vertical back edge;
  a first adjustable bracket movably mounted to said inclined front edge of said first support wall and a second adjustable bracket movably mounted to said inclined front edge of said second support wall;
  said first adjustable bracket including a pair of transversely spaced apart sidewalls that are disposed in sandwiching relation to said first support wall and said second adjustable bracket including a pair of transversely spaced apart sidewalls that are disposed in sandwiching relation to said second support wall;
  an aperture formed in each of said sidewalls of said first and second adjustable brackets;
  a first plurality of apertures formed in said first support wall in parallel relation to said inclined front edge of said first support wall and a second plurality of apertures formed in said second support wall in parallel relation to said inclined front edge of said second support wall;
  a first pin extending through said sidewalls of said first adjustable bracket and a preselected aperture of said plurality of apertures formed in said first support wall to hold said first adjustable bracket at a predetermined location along the extent of said front edge of said first support wall;
  a second pin extending through said sidewalls of said second adjustable bracket and a preselected aperture of said plurality of apertures formed in said second support wall to hold said second adjustable bracket at a predetermined location along the extent of said front edge of said second support wall;
  a first support member secured to said first adjustable bracket, said first support member extending from said first adjustable bracket in a substantially horizontal plane when said dolly is supported on a level support surface;
  a second support member secured to said second adjustable bracket, said second support member extending from said second adjustable bracket in a substantially horizontal plane when said dolly is supported on a level support surface;
  whereby said first and second adjustable brackets are positioned at any preselected height along the extent of said inclined front edges so that an item of sheet material is supported on edge by said first and second support members at said preselected height, thereby facilitating removal of said item of sheet material from said dolly.

2. The dolly of claim 1, further comprising:
  said first support member having a first clevis formed in a distal free thereof;
  said second support member having a second clevis formed in a distal free thereof;

said first clevis rotatably engaging a first end of a table that is sized to support an item of sheet material transported by said dolly;

said second clevis rotatably engaging a second end of said table;

a first leg hingedly secured to said first end of said table;

a second leg hingedly secured to said second end of said table;

said item of sheet material having a stored configuration where said table is folded so that it rests against said first and second inclined front edges of said first and second support walls and where said first and second legs are folded into abutting relation to said table; and said item of sheet material having a deployed configuration where said table is unfolded so that it is disposed in a substantially horizontal plane and so that said legs are disposed in a substantially vertical plane and supported by a substantially level support surface upon which said dolly is supported;

whereby said item of sheet material may be rotated from said stored configuration onto said table by a single individual.

3. The dolly of claim 1, further comprising:

a first flange disposed normal to said first sidewall of said first adjustable bracket, and a second flange disposed normal to said second sidewall of said first adjustable bracket;

a first flange disposed normal to said first sidewall of said second adjustable bracket, and a second flange disposed normal to said second sidewall of said second adjustable bracket;

said first and second flanges of said first adjustable bracket being flush with said first inclined front edge; and said first and second flanges of said second adjustable bracket being flush with said second inclined front edge.

\* \* \* \* \*